April 13, 1954     F. P. TAGLIAFERRI ET AL     2,674,938
DEEP FRYER WITH AUTOMATIC TIMER Filed March 11, 1952     2 Sheets-Sheet 1

INVENTORS.
FRANK P. TAGLIAFERRI.
FRANCIS T. GIER.
BY Howard J. Whelan.
ATTORNEY.

April 13, 1954 F. P. TAGLIAFERRI ET AL 2,674,938
DEEP FRYER WITH AUTOMATIC TIMER
Filed March 11, 1952 2 Sheets-Sheet 2

INVENTOR.
FRANK P. TAGLIAFERRI.
FRANCIS T. GIER.
BY Howard J. Whelan.
ATTORNEY.

Patented Apr. 13, 1954

2,674,938

UNITED STATES PATENT OFFICE 2,674,938

DEEP FRYER WITH AUTOMATIC TIMER

Frank P. Tagliaferri and Francis T. Gier,
Baltimore, Md.

Application March 11, 1952, Serial No. 275,924

2 Claims. (Cl. 99—336)

This invention relates to cooking devices and more particularly to those designed for deep-fat frying wherein an automatic timing device is incorporated for the purpose of insuring the deep-fat frying of potatoes, doughnuts, crullers, chicken and other foods which are adaptable to deep-frying methods.

In the usual process of frying potatoes, doughnuts, crullers, chicken and other foods adaptable to deep-frying methods, the articles to be fried are deposited in a pervious container, such as a basket, placed in a bath of hot fat or grease and handled in accordance with the whims and fancies of the operator, or at his convenience, and thereby the different batches of potatoes, doughnuts, crullers, chicken etc., and those cooked by different operators vary in time and temperature of cooking, resulting in non-uniform products.

This invention is designed to maintain a uniform temperature of the cooking medium, and to automatically time the cooking period, and raise the basket and cooked article out of the cooking medium to prevent its being overcooked, assuring products which are invariably uniform in character.

An object of this invention is to provide a cooker of the character set forth which will be simple in design and operation.

Another object of the invention is to provide means for heating the cooking medium and to automatically control its temperature.

Another object of this invention is to provide a deep-fryer having an automatic basket raising and temperature control.

Other objects will become apparent as the invention is more fully set forth.

For a better understanding of the invention reference is made to the appended drawings in which a particular form of the invention is shown, and to the following description wherein the details are described to show their functions, operation and use in the particular form which is used as an example to illustrate the principles of the invention, while the claims emphasize the scope of the invention.

In the construction of the invention shown in the several views of the drawings.

Similar reference characters refer to similar parts throughout the drawings.

Figure 1:
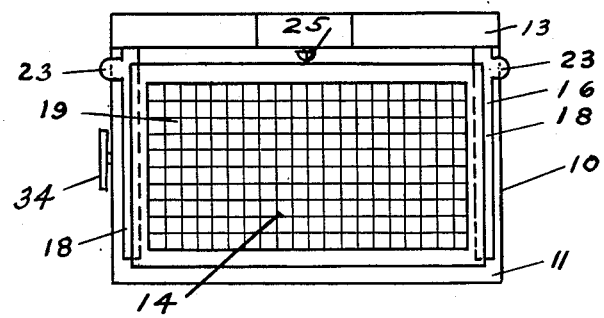
Figure 1 is a plan view of the deep-fryer with an automatic basket raiser and temperature control embodying this invention.
Figures 2, 3:
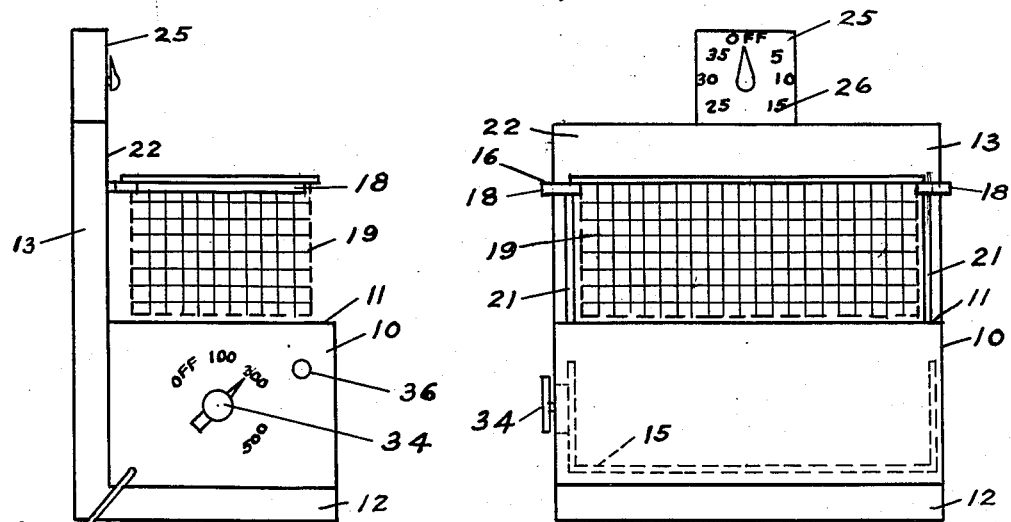
Figure 2 is a front elevation of Figure 1.
Figure 3 is a side elevation of Figure 1.
Figure 7:
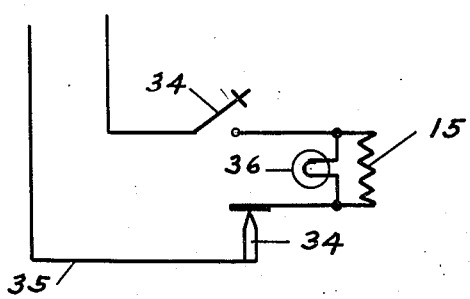
Figure 7 is a wiring diagram used in the device.
Figure 4:
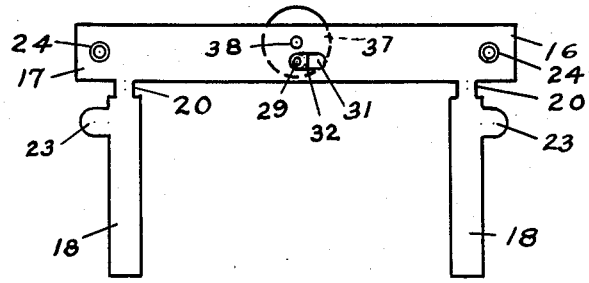
Figure 4 is a plan view of the basket supporting and raising frame in diagrammatic form.
Figure 5:
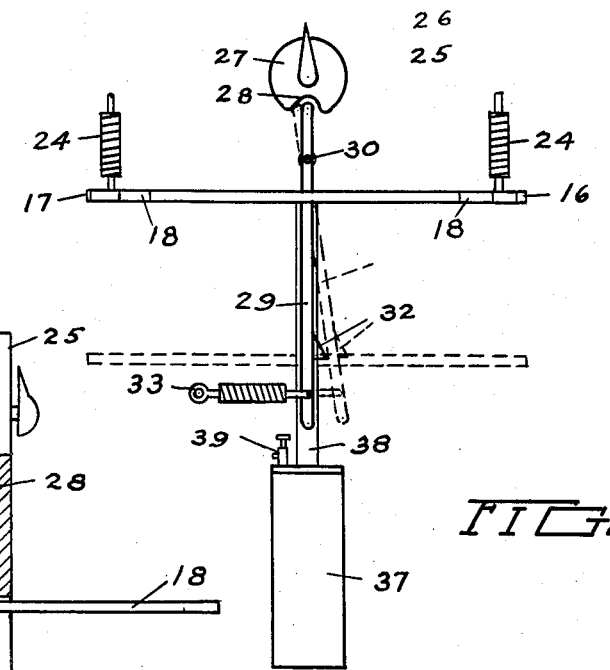
Figure 5 is a front elevation of the basket supporting and raising frame showing the operation of the tripping mechanism in diagrammatic form, the full lines showing the position of the elements when the basket is raised out of the cooking medium, and the dotted lines showing the position of the elements when the basket is in lower cooking position.
Figure 6:
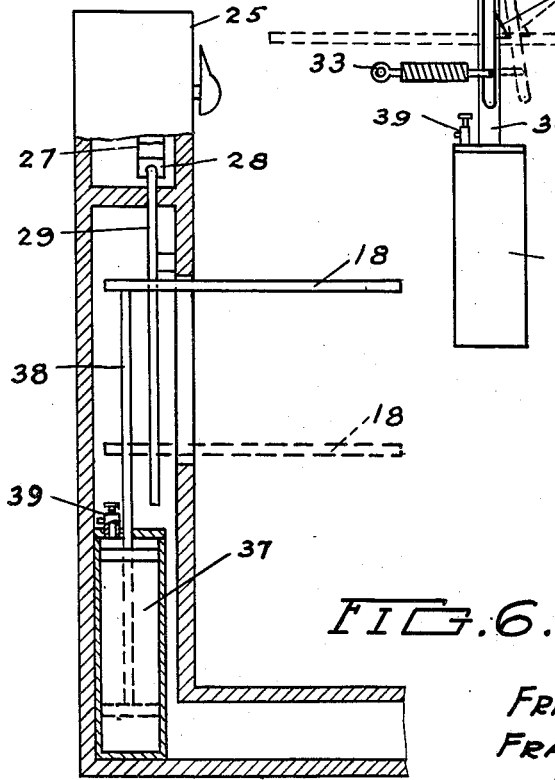
Figure 6 is an enlarged partial side view showing the basket supporting and raising frame and tripping control mechanism mounted in the cooker.

In the drawings a housing 10 is preferably rectangular in shape and completely closed-in on all sides except the top, where it is bent to form a bordering plate 11. The housing 10 is supported on a base 12 and its rear wall rests against the backing 13. The grease tank 14 is open at the top and is mounted within the housing, and serves to hold the hot grease or oil used for cooking the articles of food held within it. The grease is heated by electric elements 15 attached to the bottom and/or sides of the tank 14 and spaced apart to present an effective heating surface to the grease surrounding them in the tank. A basket raising and lowering frame 16 is provided with a rear bar 17 and projecting arms 18 to form a support for a rectangular wire basket 19 in which articles of food to be cooked are placed. The projecting arms 18 are undercut at 20 and operate in slots 21 positioned in the front wall 22 of the backing 13, to guide the basket 19 in and out of the tank 14. The arms 18 are also provided with pusher plates 23 used to lower the basket 19 into the tank 14 against the upward pull of springs 24 attached to the frame 16. The cooking time switch 25 is of the spring wound type of conventional design and usually rings a bell or alarm when the cooking cycle is completed. This conventional time switch has graduations 26 designating the amount of time the switch is wound for, and it will operate for the amount of time indicated and then stop. To this conventional time switch or signal clock is attached a cam 27 having a cut-out portion 28 to actuate a holding rod 29 at predetermined intervals. The holding rod 29 is pivoted at 30 to the backing 13 and projects through an elongated hole 31 in the rear bar 17. The holding rod 29 is provided with a latch 32 that catches and holds the frame 16 in its downward position as long as the cooking time switch is in operating position, As soon as the time switch releases its pressure against the upper end of the holding rod 29 a spring 33 pulls the rod 29 back until the latch 32 is disengaged from the rear bar 17 and springs 24 raise the basket 19 and its contents out of the cooking medium, which then drains back into the tank 14, and stops cooking the contents. The upward travel of the basket is controlled by a cylinder 37 which acts as a snubber. The frame is connected to the cylinder by a rod 38 and the speed of upward travel of the basket is regulated by air relief valve 39. In order to control the temperatures of the grease a thermostatic switch 34 is installed on the housing wall so as to switch the current on or off the conductors 35 as the occasion may require. At the same time a lamp 36 is lighted to indicate the fact the current is on. In the operation of the device the articles of food to be cooked are placed in the basket. The thermostatic switch 34 is set to the desired temperature and the cooking medium allowed to reach this temperature which is indicated when the lamp 36 goes out. The cooking time switch 25 is set to correspond with the temperature of the cooking medium and the type of food to be cooked. The projecting pusher plates 23 are pressed downward to lower the basket and food to be cooked into the cooking medium, and the latch 32 engages the rear bar 17 and holds the basket down in the cooking medium until released by the time switch 25. This allows the articles to be cooked in the grease for a certain period, then the basket is raised so the cooked articles may be removed. The device reduces the manual labor and keeps complete control of the temperature of the grease and the time for cooking the food. It is simple in construction and compact in form, yet affords a very effective arrangement.

While but one general form of the invention is shown in the drawings and described in the specification, it is not desired to limit this application for patent to this particular form as it is appreciated that other forms of construction could be made that would use the same principles and come within the scope of the appended claims.

Having thus described the invention, what is claimed is:

1. A deep fryer comprising a housing, a tank within said housing adapted to contain a cooking liquid, a basket within said tank holding articles of food, a frame supporting said basket and slidable within the tank, spring means constantly tending to raise said frame when the latter has been forced downwardly of the tank, a time switch, cam means connected with said switch, a rod cooperating with said cam means, said frame having an opening therein through which said rod extends, a latch carried by said rod, said latch normally holding the frame in position with the basket within the cooking liquid, a spring normally biasing the rod to one position against the holding position of the latch, said time switch being operable to move said cam means to tilt the rod and release the latch from the frame, whereby the frame and basket move upwardly out of the cooking liquid by the action of the aforesaid spring means.

2. A deep fryer as set forth in claim 1 in combination with means for regulating the speed of the upward movement of the frame and basket.

References Cited in the file of this patent

UNITED STATES PATENTS

| Number | Name | Date |
|---|---|---|
| 1,161,618 | Coes | Nov. 23, 1915 |
| 1,729,937 | Ginder | Oct. 1, 1929 |
| 2,088,499 | Warner | July 27, 1937 |
| 2,177,166 | Bemis | Oct. 24, 1939 |
| 2,470,548 | Desjardins | May 17, 1949 |